United States Patent
Kim

(10) Patent No.: US 12,242,968 B2
(45) Date of Patent: Mar. 4, 2025

(54) PARALLEL PROCESSING METHOD AND APPARATUS FOR NEURAL NETWORK MODEL

(71) Applicant: Samsung Electronics Co., Ltd., Suwon-si (KR)

(72) Inventor: Jaeyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 17/023,496

(22) Filed: Sep. 17, 2020

(65) Prior Publication Data

US 2021/0287085 A1 Sep. 16, 2021

(30) Foreign Application Priority Data

Mar. 16, 2020 (KR) .................. 10-2020-0032233

(51) Int. Cl.
*G06N 3/082* (2023.01)
*G06F 9/48* (2006.01)
*G06F 9/50* (2006.01)
*G06F 18/20* (2023.01)
*G06F 18/213* (2023.01)
(Continued)

(52) U.S. Cl.
CPC .......... *G06N 3/082* (2013.01); *G06F 9/5066* (2013.01); *G06F 18/213* (2023.01); *G06F 18/22* (2023.01); *G06F 18/285* (2023.01); *G06N 3/08* (2013.01); *G06F 9/4881* (2013.01); *G06F 2209/501* (2013.01)

(58) Field of Classification Search
CPC ..... G06F 18/213; G06F 9/5066; G06F 18/285
See application file for complete search history.

(56) References Cited

U.S. PATENT DOCUMENTS 9,721,204 B2  8/2017  Campos et al.
10,228,922 B2  3/2019  Boehm et al.
(Continued)

FOREIGN PATENT DOCUMENTS

CN       107527068 A    12/2017
EP       3 309 719 A1    4/2018
KR    10-2019-0036317 A  4/2019

OTHER PUBLICATIONS

Jia, Z., Lin, S., Qi, C. R., & Aiken, A. (Jun. 9, 2018). Exploring hidden dimensions in parallelizing convolutional neural networks. arXiv.org. https://arxiv.org/abs/1802.04924 (Year: 2018).*
(Continued)

*Primary Examiner* — Omar F Fernandez Rivas
*Assistant Examiner* — Quinlan E Stankus
(74) *Attorney, Agent, or Firm* — NSIP Law

(57) ABSTRACT

A parallel processing method and apparatus for a neural network model. The parallel processing method includes extracting metadata of a target layer included in a target model, measuring a similarity between the target layer and each of reference layers by comparing the metadata of the target layer to reference metadata of each of the reference layers, selecting a corresponding layer among the reference layers based on the similarities, and generating a parallelization strategy for the target layer based on a reference parallelization strategy matching the corresponding layer.

30 Claims, 8 Drawing Sheets

(51) Int. Cl.
*G06F 18/22* (2023.01)
*G06N 3/08* (2023.01)

(56) References Cited

U.S. PATENT DOCUMENTS

| | | | | |
|---|---|---|---|---|
| 2010/0251223 | A1* | 9/2010 | Gordy | G06F 8/456 |
| | | | | 717/136 |
| 2017/0132514 | A1 | 5/2017 | Krizhevsky et al. | |
| 2019/0279087 | A1* | 9/2019 | Uchida | G06V 30/1988 |
| 2020/0226493 | A1* | 7/2020 | Hari Haran | G06F 16/38 |
| 2022/0398431 | A1* | 12/2022 | Tanaka | G06N 3/04 |

OTHER PUBLICATIONS

Turner, Jack et al., "Characterising Across-Stack Optimisations for Deep Convolutional Neural Networks", 2018 IEEE International Symposium on Workload Characterization (IISWC), 2018, pp. 101-110, doi: 10.1109/IISWC.2018.8573503.

Bai, Haoli et al., "Few Shot Network Compression via Cross Distillation", Proceedings of the AAAI Conference on Artificial Intelligence, 34(04), 3203-3210. Nov. 19, 2019, (13 pages in English) https://doi.org/10.1609/aaai.v34i04.5718.

Asif, Umar et al., "Ensemble Knowledge Distillation for Learning Improved and Efficient Networks", Cornell University, Computer Science, *Computer Vision and Pattern Recognition*, arXiv:1909.08097v3 Apr. 2, 2020, (8 pages in English).

Extended European search Report issued on Sep. 6, 2021, in counterpart European Patent Application No. 21151178.7 (11 pages in English).

Jia, Zhihao, et al., "Exploring Hidden Dimensions in Parallelizing Convolutional Neural Networks", arXiv preprint arXiv:1802.04924, Jun. 9, 2018 (11 pages in English).

Jia, Zhihao et al., "Beyond Data and Model Parallelism for Deep Neural Networks", arXiv preprint arXiv:1807.05358, Jul. 14, 2018 (pp. 1-15).

Crankshaw, Daniel, et al., "Inferline: ML Inference Pipeline Composition Framework", arXiv preprint arXiv:1812.01776, Dec. 5, 2018 (pp. 1-14).

Morcos, Ari, et al., "Insights on representational similarity in neural networks with canonical correlation", *Advances in Neural Information Processing Systems*, 2018 (pp. 1-10).

Kim, Soojeong, et al., "Parallax: Sparsity-aware Data Parallel Training of Deep Neural Networks", *Proceedings of the Fourteenth EuroSys Conference 2019*, Jun. 10, 2019 (pp. 1-15).

Bai, Yunsheng, et al., "SimGNN: A Neural Network Approach to Fast Graph Similarity Computation", *Proceedings of the Twelfth ACM International Conference on Web Search and Data Mining*, Jan. 2019 (pp. 1-9).

* cited by examiner

PARALLEL PROCESSING METHOD AND APPARATUS FOR NEURAL NETWORK MODEL

CROSS-REFERENCE TO RELATED APPLICATIONS

This application claims the benefit under 35 USC § 119(a) of Korean Patent Application No. 10-2020-0032233, filed on Mar. 16, 2020, in the Korean Intellectual Property Office, the entire disclosure of which is incorporated herein by reference for all purposes.

BACKGROUND

1. Field

The following description relates to a parallel processing method and apparatus for a neural network model.

2. Description of Related Art

Technical automation of a recognition process has been implemented using, for example, a neural network model implemented by a processor as a special calculation structure, which may provide a computationally intuitive mapping between an input pattern and an output pattern after considerable training. An ability to be trained to generate such mapping may be referred to as a "training ability of a neural network." Moreover, due to specialized training, such a specialized and trained neural network may have a generalization ability to generate a relatively accurate output for an input pattern that is not trained. To process operations related to training and inference of a neural network model, a method of more quickly converging to a result may include, for example, model parallelization and/or data parallelization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a parallel processing method for a target model based on a neural network includes extracting metadata of a target layer included in the target model, measuring a similarity between the target layer and each of reference layers by comparing the metadata of the target layer to reference metadata of each of the reference layers, selecting a corresponding layer among the reference layers based on the similarities, and generating a parallelization strategy for the target layer based on a reference parallelization strategy matching the corresponding layer.

The selecting of the corresponding layer may include, in response to a presence of a first reference layer, from among the reference layers, having a same reference metadata as metadata of the target layer, selecting the first reference layer as the corresponding layer, and in response to an absence of the first reference layer among the reference layers, selecting, from among the reference layers, a second reference layer having most similar reference metadata to the metadata of the target layer as the corresponding layer.

In response to the second reference layer being selected as the corresponding layer, reference layer information corresponding to the metadata of the target layer may be added to a reference database (DB) in which the reference metadata of each of the reference layers is stored. The reference layer information may include link information. In response to the second reference layer being selected as the corresponding layer, identification information of the second reference layer may be recorded as the link information in the reference layer information.

The parallel processing method may further include, in response to the reference layer information corresponding to the metadata of the target layer being added to the reference DB, generating a new parallelization strategy corresponding to the metadata of the target layer. The generating of the new parallelization strategy may be performed independently of performing of the parallelization strategy for the target layer.

The generating of the new parallelization strategy may be performed in response to an amount of new reference layer information that includes the reference layer information corresponding to the metadata of the target layer and that is added to the reference DB exceeding a threshold. The similarities may be measured using a similarity measurement model that is based on a neural network. In response to the new parallelization strategy being generated, the similarity measurement model may be retrained based on the new parallelization strategy.

In response to the new parallelization strategy being generated, the link information of the reference layer information may be changed to an empty state. The parallel processing method may further include performing parallel processing of operations related to the target layer based on the parallelization strategy.

In another general aspect, a parallel processing apparatus for a target model based on a neural network includes a processor, and a memory including instructions executable by the processor, wherein in response to the instructions being executed by the processor, the processor is configured to extract metadata of a target layer included in the target model, to measure a similarity between the target layer and each of reference layers by comparing the metadata of the target layer to reference metadata of each of the reference layers, to select a corresponding layer among the reference layers based on the similarities, and to generate a parallelization strategy for the target layer based on a reference parallelization strategy matching the corresponding layer.

In another general aspect, an electronic apparatus includes a processor, and a memory including instructions executable by the processor, wherein in response to the instructions being executed by the processor, the processor is configured to extract metadata of a target layer included in a target model that is based on a neural network, to measure a similarity between the target layer and each of reference layers by comparing the metadata of the target layer to reference metadata of each of the reference layers, to select a corresponding layer among the reference layers based on the similarities, and to generate a parallelization strategy for the target layer based on a reference parallelization strategy matching the corresponding layer.

In another general aspect, a processor-implemented method includes extracting metadata of a target layer included in a target model based on a neural network; comparing the metadata of the target layer with metadata of each of a plurality of reference layers; in a case in which the metadata of the target layer matches the metadata of a specific reference layer among the plurality of reference layers, execute the target layer based on a first parallelization strategy corresponding to the specific reference layer; and in a case in which the metadata of the target layer does not match the metadata of any of the plurality of reference layers, executing the target layer based on a second parallelization strategy corresponding to a reference layer, from among the plurality of reference slayers, have a closest similarity to the target layer, generating a new parallelization strategy for the target layer, and subsequently executing the target layer based on the new parallelization strategy.

Executing the target layer based on the second parallelization strategy may be performed independently of generating the new parallelization strategy for the target layer.

Generating the new parallelization strategy for the target layer may include determining whether an update condition has been satisfied; and after the update condition has been satisfied, generating the new parallelization strategy for the target layer based on new reference layer information that has been added to the plurality of reference layers prior to the update condition being satisfied.

The update condition may correspond to one or both of an amount of time that has passed and an amount of the new reference layer information that has been added.

Other features and aspects will be apparent from the following detailed description, the drawings, and the claims.

Figure 1:
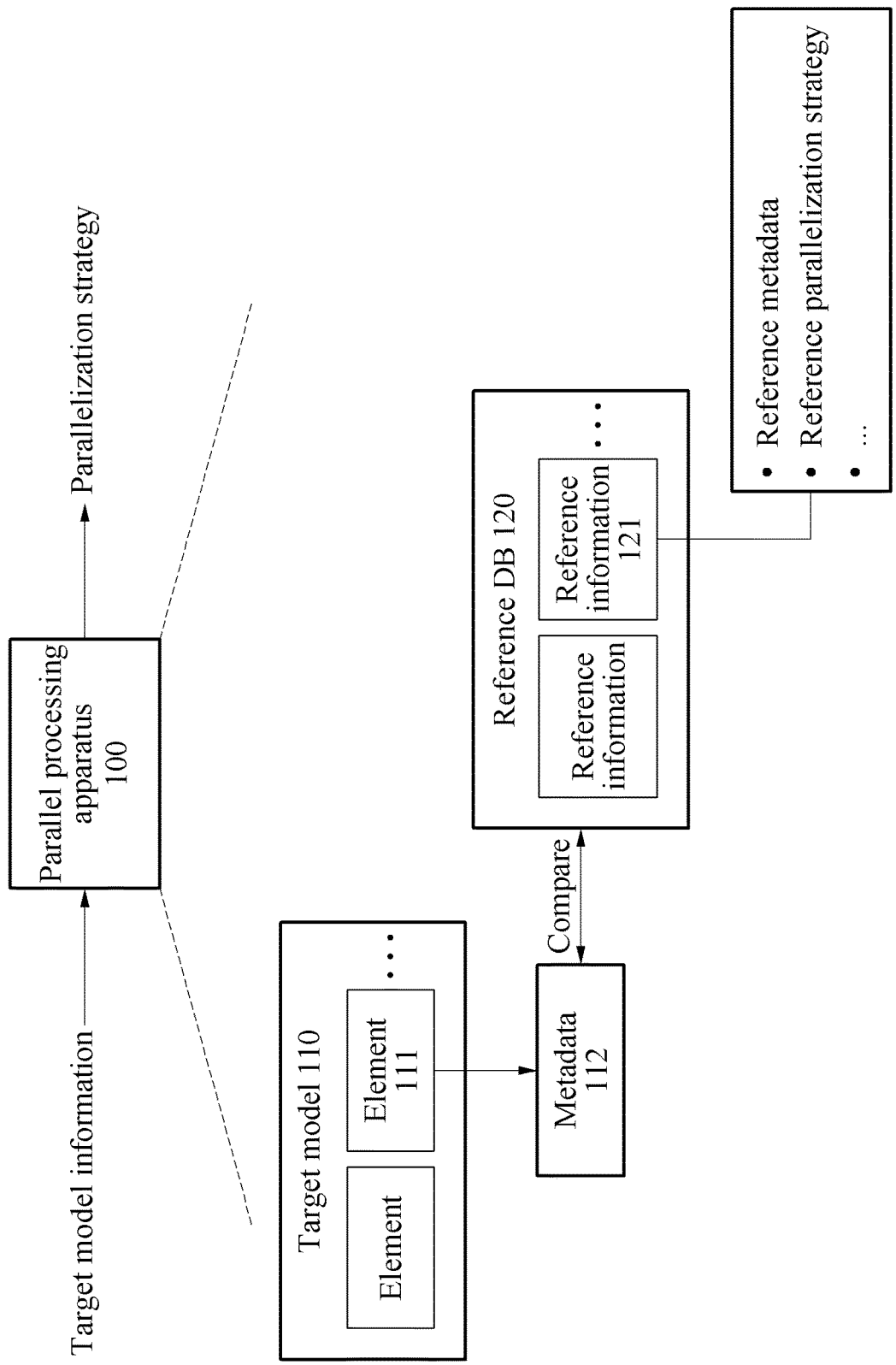
FIG. 1 schematically illustrates an example of a parallel processing process for a neural network model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples are not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, wherein like reference numerals refer to the like elements throughout.

FIG. 1 schematically illustrates an example of a parallel processing process for a neural network model. Referring to FIG. 1, a parallel processing apparatus 100 may generate a parallelization strategy for a target model 110 based on target model information. The parallel processing apparatus 100 may perform parallel processing (for example, training and/or inference) for the target model 110 based on the generated parallelization strategy. For example, the target model 110 may be based on an artificial neural network, hereinafter referred to as a "neural network", and operations for training and/or inference of the target model 110 may be performed in parallel based on the parallelization strategy.

The neural network may be trained to perform an operation (for example, an object recognition operation or a user authentication operation) according to the purpose of training, by mapping input data and output data that are in a nonlinear relationship based on deep learning. The deep learning may be a machine learning scheme for solving an issue such as image or voice recognition from a big data set. The deep learning may be understood as a process of solving an optimization issue to find a point at which energy is minimized while training a neural network based on prepared training data.

Through supervised or unsupervised learning of the deep learning, a structure of the neural network or a weight corresponding to a model may be obtained, and input data and output data may be mapped to each other through the weight. For example, when a width and a depth of the neural network are sufficiently large, the neural network may have a capacity large enough to implement an arbitrary function. When the neural network is trained on a sufficiently large quantity of training data through an appropriate training process, an optimal performance may be achieved.

In the following description, the neural network or network parameters (for example, weights) may be expressed as being "pre-trained", where "pre-" may indicate a state before the neural network is "started". The "started" neural network may indicate that the neural network may be ready for inference. For example, "start" of the neural network may include loading of the neural network in a memory, or an input of input data for inference to the neural network after the neural network is loaded in a memory.

The neural network may include a plurality of layers. In this example, the neural network may be referred to as a deep neural network (DNN). The plurality of layers may include an input layer, at least one hidden layer, and an output layer. The target model 110 may include a plurality of elements, for example, an element 111. For example, the plurality of elements of the target model 110 may correspond to components of a neural network, for example, a plurality of layers, or a plurality of nodes. In the following description, each of the elements of the target model 110 corresponds to a layer of the neural network, however, examples are not limited thereto. For example, the following description may be applicable to an example in which each of the elements of the target model 110 corresponds to another component of the neural network, instead of a layer.

The neural network may include various types of networks, for example, a fully connected network, a convolutional neural network (CNN), or a recurrent neural network (RNN). For example, at least a portion of the plurality of layers in the neural network may correspond to a CNN, and another portion may correspond to a fully connected network. Also, the neural network may include a plurality of layers based on each type. For example, the plurality of layers of the neural network may include at least one of various types of layers, for example, a fully connected layer, a convolution layer, or a recurrent layer.

A policy such as model parallelization and/or data parallelization may be used as a scheme of more quickly converging to a result to process an operation related to training and/or inference of a neural network model. Parallel processing and parallelization strategies may be understood as concepts including distributed processing and distribution strategies. The model parallelization is a scheme of dividing a neural network model and performing calculation in a different accelerator, and the data parallelization is a scheme of dividing data given as an input and performing calculation in a different accelerator. The model parallelization may be broadly divided into a scheme of using pipelining and inter-layer parallelism, and an intra-layer parallelism scheme.

The inter-layer parallelism is a scheme of assigning layers in a neural network model to different accelerators and performing calculation, and the intra-layer parallelism is a scheme of assigning internal values of layers of a neural network model to different accelerators and performing calculation. The internal values of the layers may be kernel weights and input feature maps in the case of a CNN, or may be weights of cells forming layers of an RNN or other information for calculation in the case of the RNN.

A parallelization scheme between nodes also exists. The nodes may refer to servers connected over a network, or end-point equipment. Distributed processing between nodes may be performed to distribute weights of a neural network model and perform training and inference. To this end, a parameter sharing scheme or a message passing interface (MPI) may be mainly used. Also, a hybrid scheme of using the parameter sharing scheme and the MPI may be used.

Strategies for the above parallelization schemes may include an asynchronous scheme and a synchronous scheme. Synchronous training is a scheme of updating a neural network model when works of workers learning weights are completed and all data is collected. Asynchronous training is a scheme of updating a neural network model by each of workers based on a value obtained by calculation of each of the workers immediately when the calculation is terminated regardless of an action of another worker.

Also, strategies may be applied differently depending on whether characteristics of weights are dense or sparse. Dense weights indicate that a zero is rarely present in a weight matrix, and sparse weights indicate that a plurality of zeros or consecutive zeros are present in the weight matrix.

Such various parallelization schemes and policies may be used as elements for a parallelization strategy. For example, a parallelization strategy element may include a parallelization scheme such as an intra-layer parallelism or an inter-layer parallelism, a partition dimension indicating a direction (for example, a width direction, a height direction, a channel direction, or a batch direction) in which a model, a layer or data is divided, a division number indicating a number of models to be divided, a number of layers to be divided or a quantity of data to be divided, information of a processing device such as a processor (for example, a neural network processing unit (NPU), a graphics processing unit (GPU), NPU #1, or NPU #2) for performing parallel processing, or a core (for example, NPU core #1, or NPU core #5), and information about a parallelization algorithm such as asynchronous, synchronous, or all-reduce algorithms. In addition to the above elements, the parallelization strategy element may include various methods and policies associated with parallelization known through a variety of papers and academic research.

A parallelization strategy for the target model 110 may include various strategy elements to perform parallel processing of various operations related to training and/or inference of the target model 110. The parallel processing apparatus 100 may generate the above parallelization strategies for each element of the target model 110, and may execute each element of the target model 110 based on parallelization strategies for training and/or inference of the target model 110.

For example, the parallel processing apparatus 100 may extract metadata 112 of the element 111, may compare the metadata 112 to each reference information of the reference DB 120, may select reference information 121 corresponding to the element 111 among a variety of reference information of the reference DB 120, and may generate a parallelization strategy for the element 111 based on the reference information 121. The reference DB 120 may include the variety of reference information. Each reference information may correspond to a unit corresponding to the element 111. For example, when each element of the target model 110 corresponds to a layer of a neural network, each reference information of the reference DB 120 may also correspond to a layer of the neural network. In this example, each reference information may be referred to as a "reference layer information".

Each reference information of the reference DB 120 may include reference metadata, or a reference parallelization strategy. The parallel processing apparatus 100 may compare the metadata 112 to reference metadata of each reference information and may select the reference information 121. The reference information 121 may have most similar reference metadata to the metadata 112 among all reference information of the reference DB 120. For example, reference metadata of the reference information 121 may be the same as the metadata 112, or may be most similar to the metadata 112 in comparison to reference metadata of other reference information although not the same as the metadata 112.

The parallel processing apparatus 100 may generate a parallelization strategy for the element 111 based on a reference parallelization strategy of the reference information 112. The reference parallelization strategy may include application information associated with various parallelization strategy elements. For example, the parallel processing apparatus 100 may select the reference parallelization strategy of the reference information 112 as a parallelization strategy for the element 111. In this example, the parallel processing apparatus 100 may perform parallel processing (for example, training and/or inference) for the element 111 based on the generated parallelization strategy. The parallel processing apparatus 100 may repeat the above process for each element of the target model 110, to generate parallelization strategies for each element and perform parallel processing for each element.

For optimization of parallel processing of an existing neural network model, a simulator and model profiling need to be used offline (for example, a time in which a neural network model is not executed). This is because a training rate and a response time may be reduced when simulation and profiling are performed online (for example, a time in which a neural network model is executed), although an application for training or inferring a neural network model needs to guarantee a user a high training rate and a fast response time (latency).

According to examples, the parallel processing apparatus 100 may minimize a training rate and a response time using the reference DB 120, and thus a parallelization strategy may be generated at runtime. For example, the parallel processing apparatus 100 may be applicable to a system, for example, an autonomous vehicle, configured to learn or infer data in real time, and a cloud computing and a data center that need to perform parallel processing of a large quantity of data. Recently, with development of artificial intelligence technologies, neural network model applications are becoming large and diverse, and a greater amount of time and effort are required to establish a parallelization strategy for the neural network model applications. According to examples, the parallel processing apparatus 100 may generate a new parallelization strategy through continuous updating, and thus it is possible to cope with the above large and diverse applications.

Figure 2:
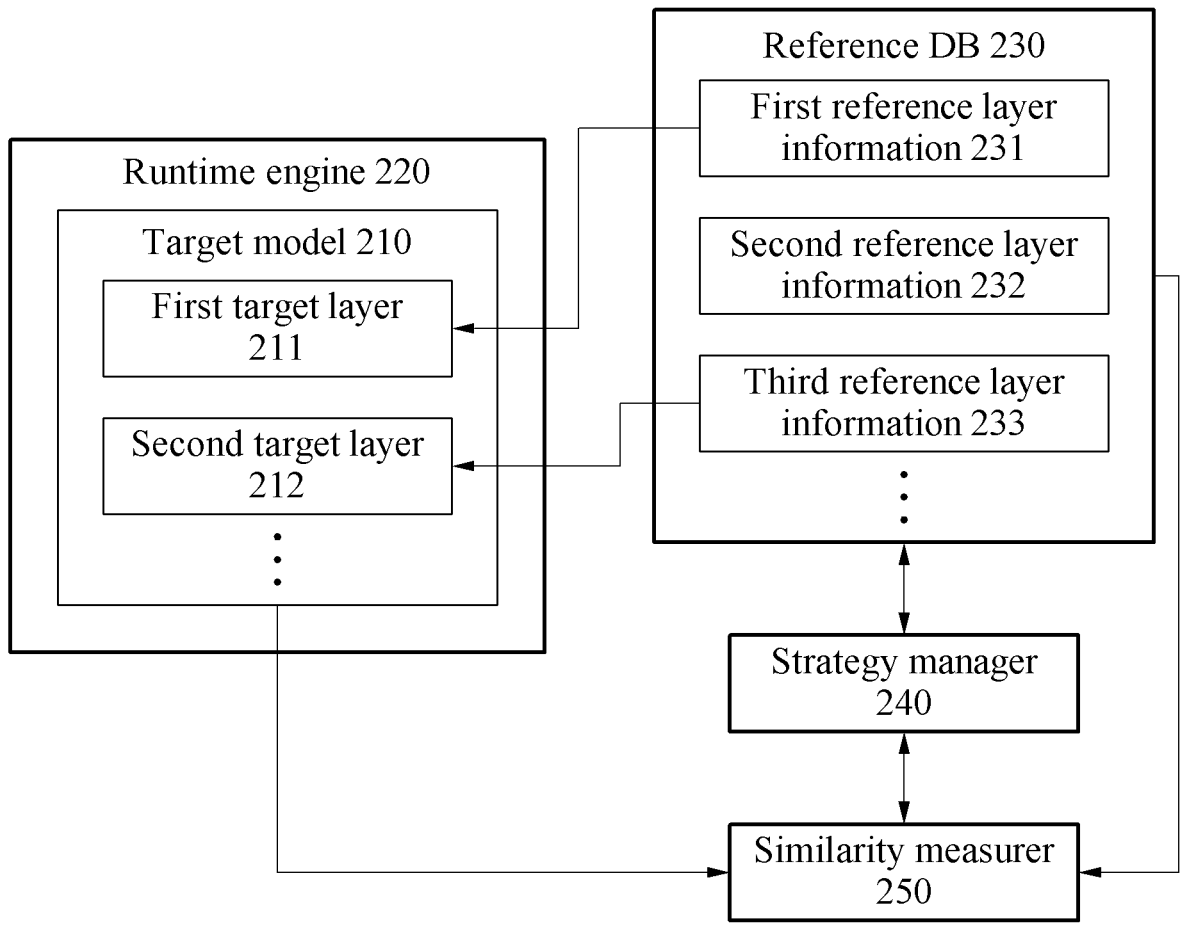
FIGS. 2 and 3 illustrate examples of a parallel processing operation of each component of a parallel processing apparatus.
Figure 3:
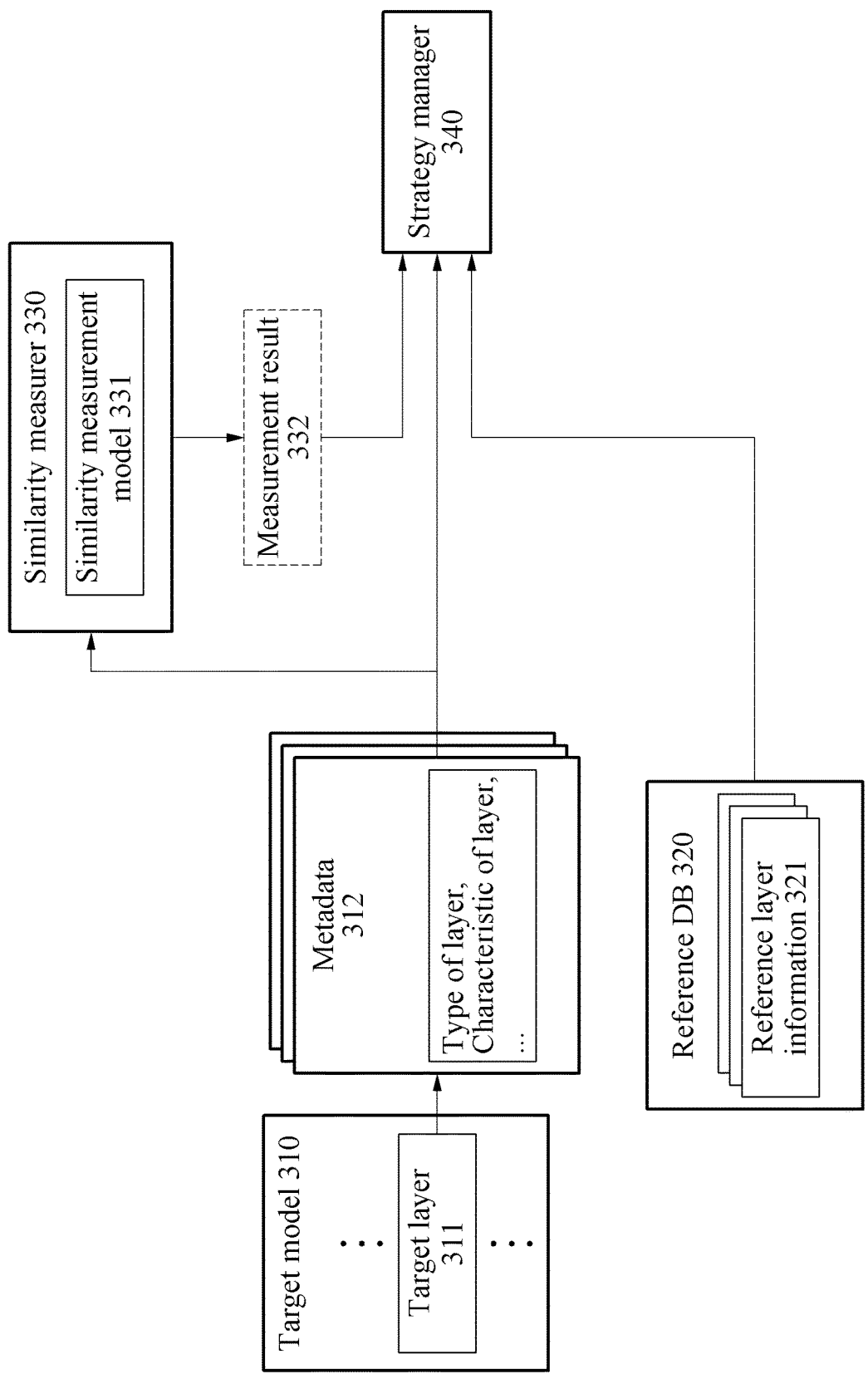

FIGS. 2 and 3 illustrate examples of a parallel processing operation of each component of a parallel processing apparatus. FIG. 2 illustrates operations of a runtime engine 220, a reference DB 230, a strategy manager 240, and a similarity measurer 250. The runtime engine 220, the reference DB 230, the strategy manager 240, and the similarity measurer 250 may be implemented as at least one hardware module, at least one software module, and/or a combination thereof. Operations related to parallel processing will be described below from the perspective of the runtime engine 220, the reference DB 230, the strategy manager 240, and the similarity measurer 250, but do not need to be necessarily performed by separated components, such as the runtime engine 220, the reference DB 230, the strategy manager 240, and the similarity measurer 250. For example, an operation described as being performed by one component may be performed by another component, or the above operations may be performed by a single integrated component, for example, a parallel processing apparatus.

The runtime engine 220 may execute a target model 210 given as an input. For example, the runtime engine 220 may execute the target model 210 for training and/or inference of the target model 210. The runtime engine 220 may execute the target model 210 based on a parallelization strategy of each target layer of the target model 210. For example, a first reference parallelization strategy of first reference layer information 231 may be adopted as a parallelization strategy for a first target layer 211, and a third reference parallelization strategy of third reference layer information 233 may be adopted as a parallelization strategy for a second target layer 212. In this example, the runtime engine 220 may execute the first target layer 211 based on the first reference parallelization strategy, and may execute the second target layer 212 based on the second reference parallelization strategy. Also, the runtime engine 220 may output an execution time of the target model 210 or each target layer. The execution time may be used to evaluate a performance of each parallelization strategy.

The reference DB 230 may include reference layer information associated with each of various reference layers. Reference layer information of each reference layer may include reference metadata and a reference parallelization strategy associated with each reference layer. For example, the first reference layer information 231 may include first reference metadata and a first reference parallelization strategy corresponding to a first reference layer. Reference metadata may include metadata of a reference layer, and a reference parallelization strategy may include a parallelization strategy applied to the reference layer and a performance (for example, an execution time) of the parallelization strategy.

In an example, a parallelization strategy for a layer of a predetermined neural network may have been generated in the past. In this example, extensive simulation or profiling of the layer may be performed offline, and an optimal parallelization strategy may have been established. The layer may be defined as a first reference layer, metadata of the layer may be defined as first reference metadata, a parallelization strategy of the layer may be defined as a first parallelization strategy, and the first reference layer, the first reference metadata and the first parallelization strategy may be stored in the reference DB 230.

As described above, the reference DB 230 may store data associated with the optimal parallelization strategy performed offline, as initial data for the reference layer information. The initial data may be used to establish a new parallelization strategy in a process of updating a parallelization strategy. For example, when a reference layer having the same reference metadata as metadata of the first target layer 211 is absent among reference layers, a reference layer having most similar reference metadata to the metadata of the first target layer 211 may be selected as a layer corresponding to the first target layer 211.

Since the metadata of the selected reference layer is different from the metadata of the first target layer 211, a parallelization strategy of the selected reference layer may not be regarded to be optimized for the first target layer 211. Thus, the strategy manager 240 may generate a new parallelization strategy for the first target layer 211, even though the parallelization strategy of the selected reference layer is applied to the first target layer 211. For example, the strategy manager 240 may generate an optimal parallelization strategy for the first target layer 211 by performing simulation or profiling associated with the first target layer 211.

The similarity measurer 250 may compare metadata of each target layer of the target model 210 and reference metadata of each reference layer of the reference DB 230, and may measure a similarity between each target layer and each reference layer. For example, the similarity measurer 250 may extract the metadata of the first target layer 211, may compare the metadata of the first target layer 211 to each of first reference metadata of the first reference layer information 231, second reference metadata of the second reference layer information 232 and third reference metadata of third reference layer information 233, and may measure a similarity between the first target layer 211 and each of the first reference layer, a second reference layer and a third reference layer.

For example, metadata may include input data, output data, a characteristic (for example, a size, or a sparsity) of a weight, and a type of layers (for example, a fully connected layer, a convolution layer, or a recurrent layer). In a CNN, metadata of a layer may include a kernel size, padding, and stride. In an RNN, metadata of a layer may include cell information, gate information, and input embedding. Reference metadata may also include information associated with the above-described items. The similarity measurer 250 may measure a similarity between a target layer and a reference layer by comparing corresponding items between metadata of the target layer and reference metadata of the reference layer.

The strategy manager 240 may select a layer (hereinafter, referred to as a "corresponding layer") corresponding to the target layer among reference layers based on the similarity measured by the similarity measurer 250, and may generate a parallelization strategy for the target layer based on a reference parallelization strategy matching the corresponding layer. The strategy manager 240 may select a reference layer with a highest similarity as a corresponding layer. For example, when the first reference layer among the reference layers has a highest similarity to the first target layer 211, the strategy manager 240 may select the first reference layer as a corresponding layer of the first target layer 211, and may generate a parallelization strategy for the first target layer 211 based on the first reference parallelization strategy.

FIG. 3 illustrates parallel processing operations of a reference DB 320, a similarity measurer 330, and a strategy manager 340, in association with a target model 310. The reference DB 320, the similarity measurer 330, and the strategy manager 340 may be implemented as at least one hardware module, at least one software module, and/or a combination thereof. Also, as described above with reference to FIG. 2, operations that will be described below are not necessarily performed separately by the reference DB 320, the similarity measurer 330, and the strategy manager 340. For example, an operation described as being performed by one component may be performed by another component, or the above operations may be performed by a single integrated component, for example, a parallel processing apparatus.

The similarity measurer 330 may extract metadata 312 of a target layer 311 included in the target model 310. The metadata 312 may include a type of a layer (for example, a fully connected layer, a convolution layer, or a recurrent layer), or characteristics of data (for example, input data, output data, and a characteristic of a weight). The similarity measurer 330 may compare the metadata 312 to reference metadata of each reference layer, and may measure a similarity between the target layer 311 and each reference layer. A measurement result 332 may include information about the similarity between the target layer 311 and each reference layer.

The similarity measurer 330 may include a similarity measurement model 331 based on a neural network. The similarity measurement model 331 may be pre-trained based on the reference DB 320. For example, the similarity measurement model 331 may be pre-trained to compare the metadata 312 to each reference metadata of the reference DB 320 and to output a similarity between the target layer 311 and each reference layer in response to an input of the metadata 312.

For example, when the metadata 312 is considerably similar to first reference metadata of a first reference layer and is the same as second reference metadata of a second reference layer, a similarity between the target layer 311 and the first reference layer and a similarity between the target layer 311 and the second reference layer may be "0.95" and "1.0" in the measurement result 332, respectively. As described above, new reference layer information may be added to the reference DB 320 in response to generation of a new parallelization strategy. In this example, the similarity measurement model 331 may be updated based on a predetermined condition (for example, an amount of the added new reference layer information exceeds a threshold).

The strategy manager 340 may generate a parallelization strategy for the target layer 311 based on any one or any combination of the metadata 312, reference layer information 321, and the measurement result 332. For example, when the first reference layer among reference layers has a highest similarity to the target layer 311, the strategy manager 340 may select the first reference layer as a corresponding layer of the target layer 311, and may generate a parallelization strategy for the target layer 311 based on a first reference parallelization strategy.

Figure 4:
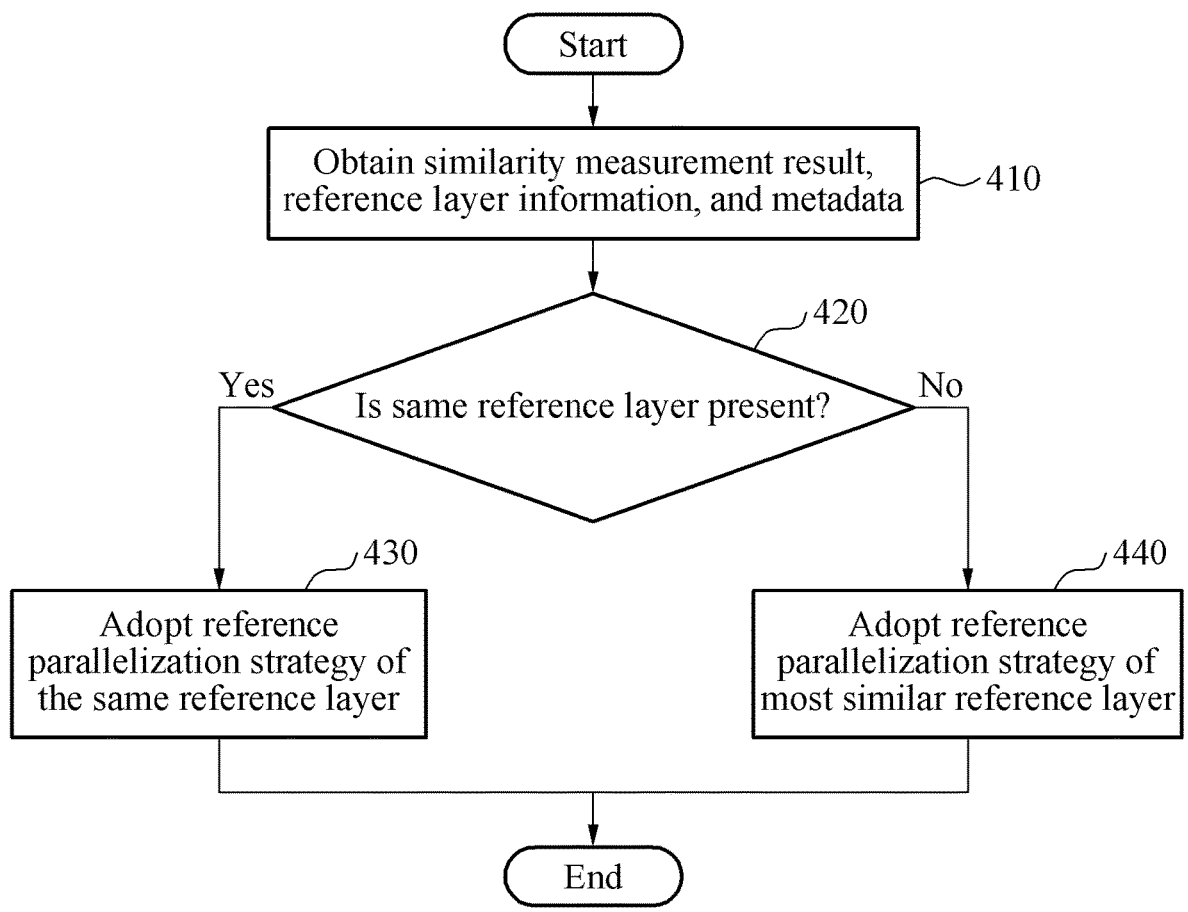
FIG. 4 illustrates an example of adopting a parallelization strategy based on whether a reference layer having the same metadata as that of a target layer is present.

FIG. 4 illustrates an example of adopting a parallelization strategy based on whether a reference layer having the same metadata as metadata of a target layer is present. Referring to FIG. 4, in operation 410, a parallel processing apparatus obtains a similarity measurement result, reference layer information, and metadata. For example, the parallel processing apparatus may obtain the similarity measurement result from a similarity measurer, may obtain the reference layer information from a reference DB, and may obtain the metadata from the target layer.

In operation 420, the parallel processing apparatus determines whether a reference layer (hereinafter, briefly referred to as a "same reference layer") having the same metadata as that of the target layer is present. For example, in determining of a parallelization strategy of the target layer, different processing processes may be performed based on whether the same reference layer is in the reference DB. When the same reference layer is present, a reference parallelization strategy of the same reference layer may be adopted in operation 430, and the parallelization strategy of the target layer may be determined based on the reference parallelization strategy of the same reference layer. When the same reference layer is absent, a reference parallelization strategy of a reference layer (hereinafter, briefly referred to as a "most similar reference layer") most similar to the target layer, instead of the same reference layer, may be adopted in operation 440, and the parallelization strategy of the target layer may be determined based on the reference parallelization strategy of the most similar reference layer.

Absence of the same reference layer may indicate that a selected reference parallelization strategy may not be optimal for the target layer. This is because the reference parallelization strategy of the most similar reference layer is not guaranteed to be optimized for the target layer despite the most similar reference layer, because a reference layer matching the target layer is absent even though optimal parallelization strategies for each reference layer are in the reference DB. Accordingly, a task of finding a parallelization strategy optimal for the target layer may be additionally performed. However, since a relatively long period of time is required for a task of finding a new parallelization strategy, the parallelization strategy of the most similar reference layer may be applied to the target layer and the task of finding a new parallelization strategy may be performed in the future.

When the same reference layer is absent, the parallel processing apparatus may add reference layer information corresponding to the metadata of the target layer to the reference DB. This is because the target layer corresponds to a layer with a new type of metadata, and accordingly a new strategy for the target layer needs to be included in the reference DB. The reference parallelization strategy of the most similar reference layer may be stored as a reference parallelization strategy of new reference layer information. The reference parallelization strategy of the new reference layer information may be updated through an optimization process later.

In an example, each reference layer information of the reference DB may include link information. When a reference parallelization strategy of reference layer information is optimized for a reference layer with the reference layer information, link information of the reference layer information may be represented to be empty. For example, link information of reference layer information corresponding to initial data may be represented to be empty. For example, when a reference parallelization strategy of reference layer information is not optimized for a reference layer with the reference layer information, link information of the reference layer information may be shown as identification information of a most similar reference layer.

For example, when a target layer that does not have the same reference layer in the reference DB as described above, new reference layer information of the target layer may be added to the reference DB. In this example, when the new reference layer information is added to the reference DB, identification information of a most similar reference layer to the target layer may be shown as link information of the new reference layer information. When a new optimal parallelization strategy for the target layer is generated, a reference parallelization strategy of the new reference layer information may be updated as the new parallelization strategy, and the link information of the new reference layer information may be changed to an empty state.

Figure 5:
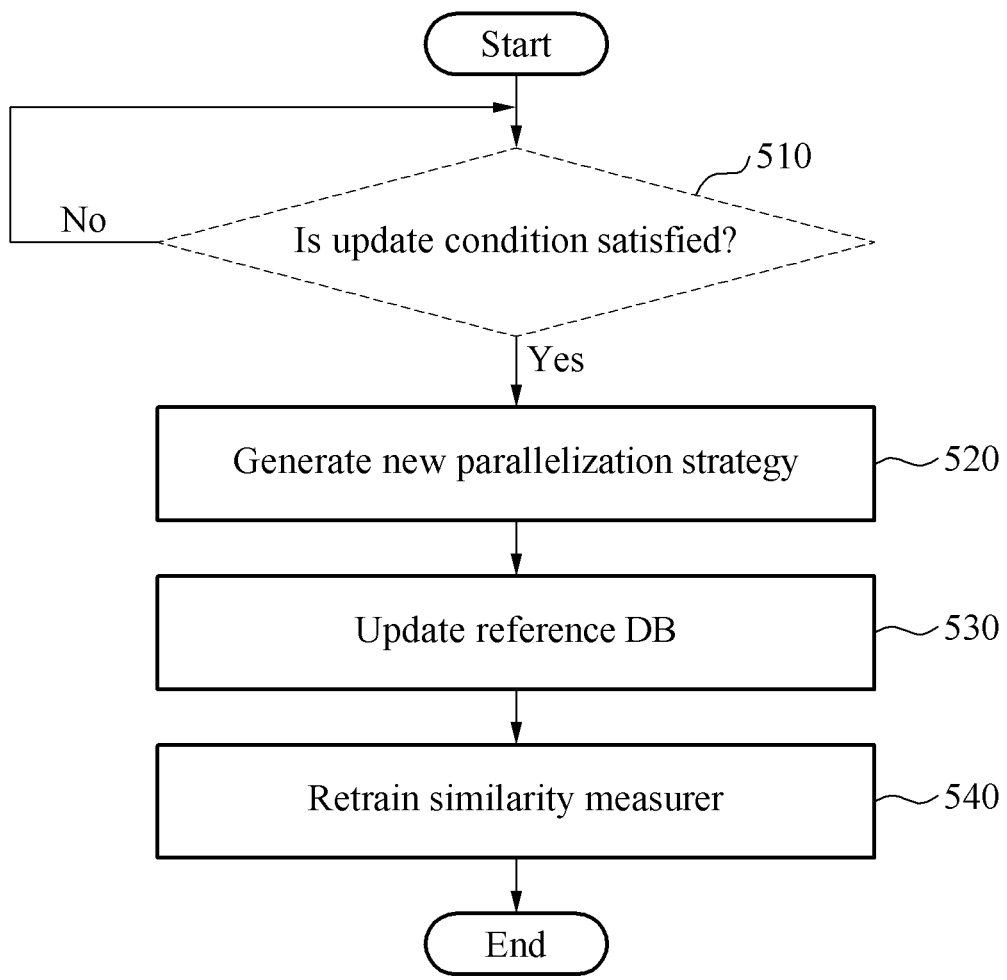
FIG. 5 illustrates an example of operations related to generation of a new parallelization strategy.

FIG. 5 illustrates an example of operations related to generation of a new parallelization strategy. Referring to FIG. 5, in operation 510, a parallel processing apparatus determines whether an update condition is satisfied. For example, the update condition may be set based on an amount (for example, ten items) of new reference layer information added to a reference DB, or a period of time (for example, one day or one week) elapsed after a previous update. In this example, a numerical value, for example, ten items, one day or one week, may be set as a threshold. For example, the update condition may include adding ten items of new reference layer information to the reference DB. In this example, when the ten items of new reference layer information are added, operations 520, 530 and 540 may be performed.

In operation 520, the parallel processing apparatus generates a new parallelization strategy for each new reference layer. For example, the parallel processing apparatus may generate an optimal parallelization strategy for a new reference layer by performing profiling or simulation related to a new reference layer. In this example, a unit of batch processing may decrease in comparison to existing offline profiling and simulation processing. Since profiling of a small unit of batch processing is not offline profiling and simulation for the entire model, a relatively small amount of time may be required in comparison to the existing offline profiling and simulation.

When the new parallelization strategy is generated, the parallel processing apparatus may update the reference DB in operation 530, and may retrain a similarity measurer (for example, a similarity measurement module) in operation 540. For example, the parallel processing apparatus may record the new parallelization strategy instead of a parallelization strategy of a most similar reference layer recorded as a reference parallelization strategy in new reference layer information of the reference DB. Also, the parallel processing apparatus may retrain the similarity measurer based on the updated reference DB. As described above, the similarity measurement module may be trained based on the reference DB. Since the reference DB is updated in response to generation of the new parallelization strategy, the similarity measurement module may be retrained based on the updated reference DB. When operation 540 is completed, operation 510 may be re-performed.

Operations 510 through 540 of FIG. 5 related to generation of a new parallelization strategy may be performed independently of operations 410 through 440 of FIG. 4 related to parallel processing of a target layer. For example, when the parallel processing of the target layer is being performed, an operation related to generation of a new parallelization strategy may be performed in a background. Also, before updating of the reference DB or retraining of the similarity measurer is completed, a parallelization strategy may be selected from the existing reference DB. Through independency of the above series of operations, a speed at which parallel processing may be performed at runtime may be secured. Also, existing data may be used until updating is completely terminated, and thus stability of parallel processing may be maintained.

Figure 6:
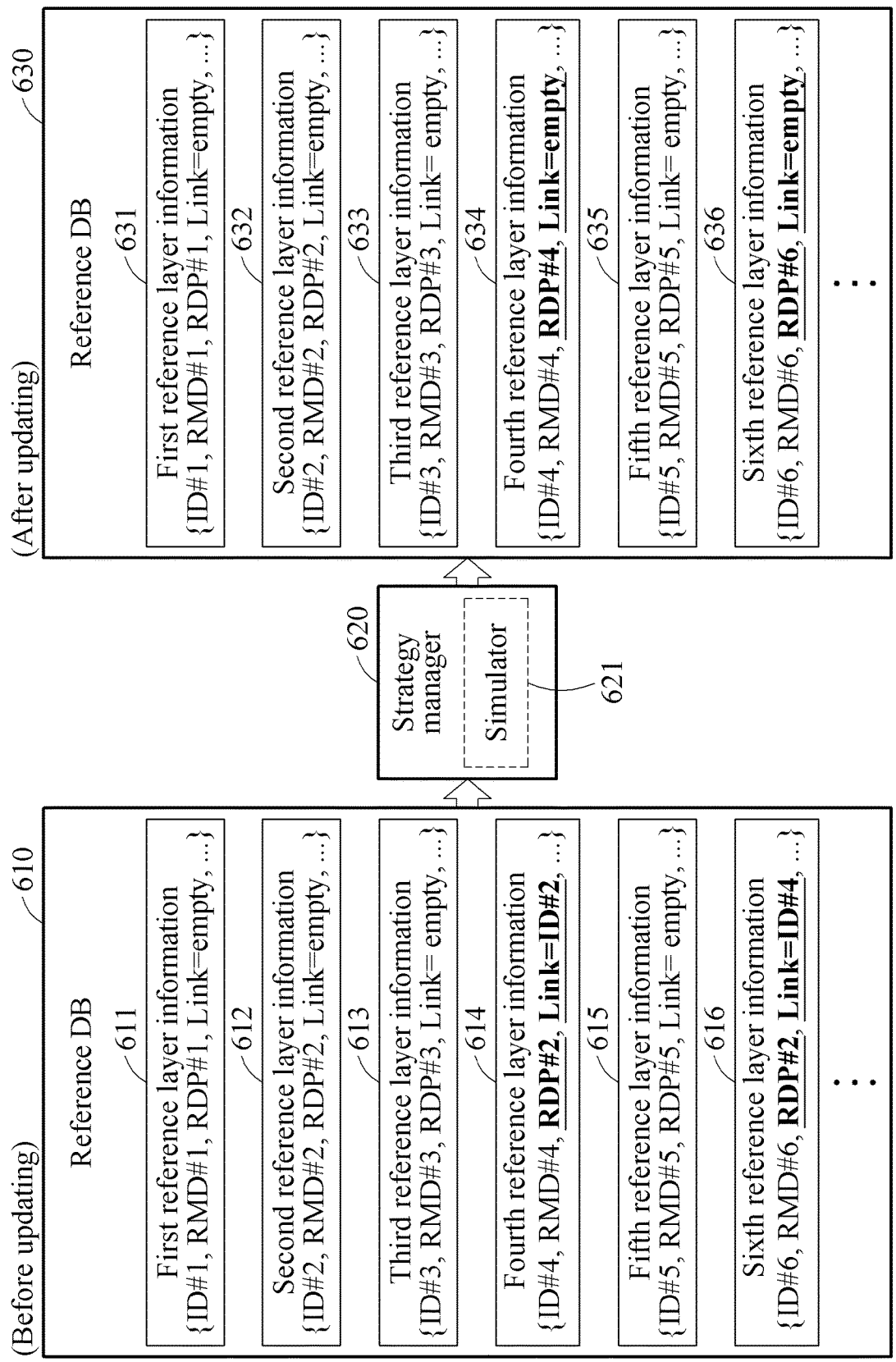
FIG. 6 illustrates examples of reference databases (DBs) before and after updating.

FIG. 6 illustrates examples of reference DBs before and after updating. Referring to FIG. 6, a reference DB 610 stores first reference layer information 611 through sixth reference layer information 616 before updating, and a reference DB 630 stores first reference layer information 631 through sixth reference layer information 636 after updating.

The first reference layer information 611 through the sixth reference layer information 616 and the first reference layer information 631 through the sixth reference layer information 636 may include identification information ID #1 through ID #6, reference metadata RMD #1 through RMD #6, reference parallelization strategies RDP #1 through RDP #6, and link information empty, ID #2 and ID #4 of reference layers. For example, the first reference layer information 611 and 631, second reference layer information 612 and 632, and third reference layer information 613 and 633 may correspond to initial data. As described above, initial data may include a parallelization strategy established offline through a process, for example, simulating or profiling.

Thus, link information of each of the first reference layer information 611 and 631, the second reference layer information 612 and 632, and the third reference layer information 613 and 633 may be represented to be "empty".

Also, fourth reference layer information 614 and the sixth reference layer information 616 may be newly added to the reference DB 610 due to absence of the same reference layer. Thus, identification information ID #2 of a second reference layer may be indicated as link information of the fourth reference layer information 614, and a reference parallelization strategy RDP #2 of the second reference layer may be indicated as a reference parallelization strategy of the fourth reference layer information 614. Similarly, identification information ID #4 of a fourth reference layer may be indicated as link information of the sixth reference layer information 616, and the reference parallelization strategy RDP #2 of the second reference layer may be indicated as a reference parallelization strategy of the sixth reference layer information 616. In other words, it may be confirmed that the sixth reference layer information 616 is added to the reference DB 610 before the reference DB 610 is updated after the fourth reference layer information 614 is added to the reference DB 610.

As described above, the parallel processing apparatus may update the reference DB 610 in response to an update condition being satisfied. For example, a simulator 621 of a strategy manager 620 may generate a new parallelization strategy RDP #4 for the fourth reference layer and a new parallelization strategy RDP #6 for a sixth reference layer, and the parallel processing apparatus may update the fourth reference layer information 614 and the sixth reference layer information 616 based on the new parallelization strategies RDP #4 and RDP #6. Also, the parallel processing apparatus may change the link information of the fourth reference layer information 614 and the sixth reference layer information 616 to an empty state. Fourth reference layer information 634 and the sixth reference layer information 636 may indicate a state of being finally updated. The reference DB 610 also stores fifth reference layer information 615 before updating, and the reference DB 630 stores fifth reference layer information 635 after updating.

Figure 7:
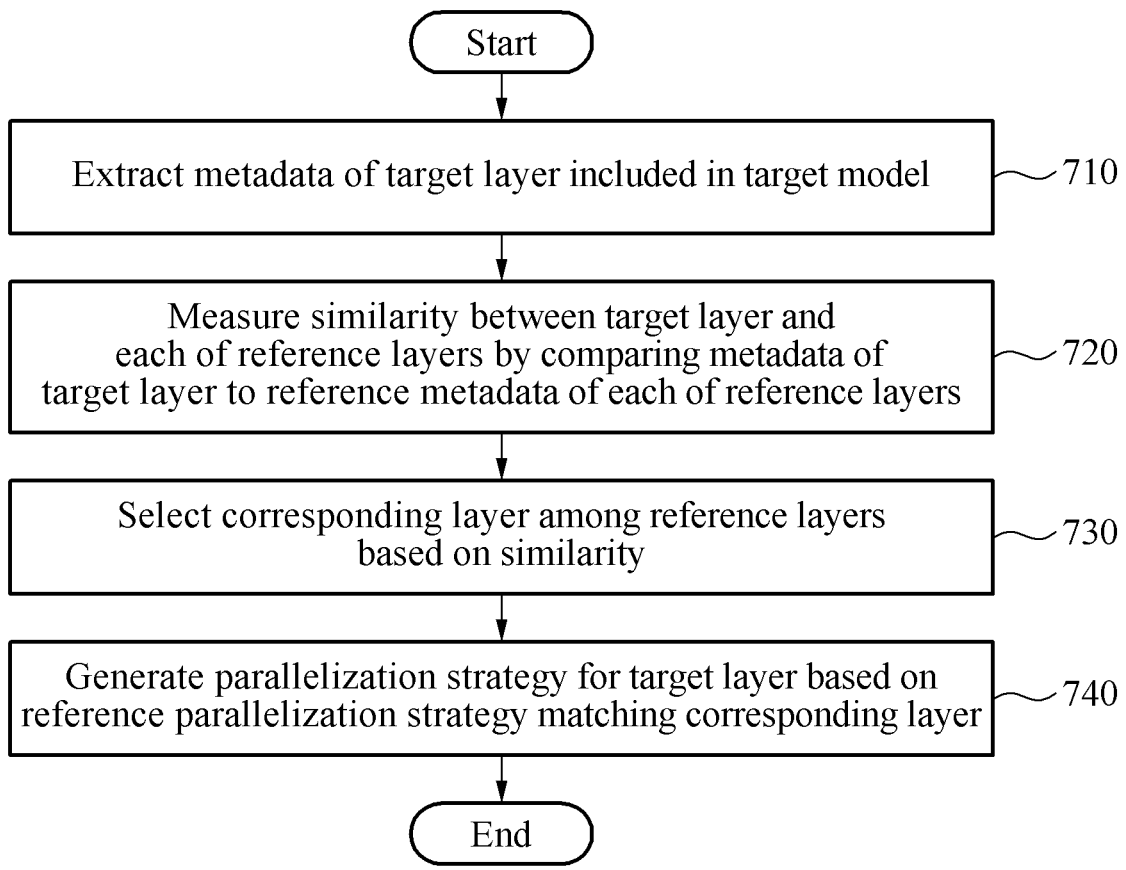
FIG. 7 illustrates an example of an overall parallel processing process.

FIG. 7 illustrates an example of an overall parallel processing process. Referring to FIG. 7, a parallel processing apparatus extracts metadata of a target layer included in a target model in operation 710, measures a similarity between the target layer and each of reference layers by comparing the metadata of the target layer to reference metadata of each of the reference layers in operation 720, selects a corresponding layer among the reference layers based on the similarity in operation 730, and generates a parallelization strategy for the target layer based on a reference parallelization strategy matching the corresponding layer in operation 740. The above description of FIGS. 1 through 6 is also applicable to the parallel processing process.

Figure 8:
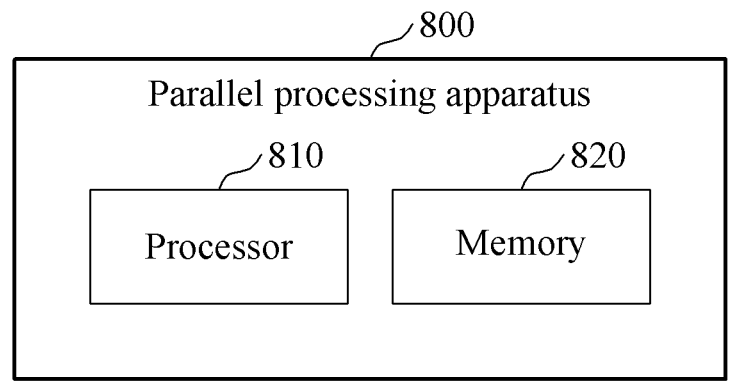
FIG. 8 illustrates an example of a parallel processing apparatus.

FIG. 8 illustrates an example of a parallel processing apparatus 800. Referring to FIG. 8, the parallel processing apparatus 800 includes a processor 810 and a memory 820. The memory 820 may be connected to the processor 810, and may store instructions executable by the processor 810, data to be computed by the processor 810, or data processed by the processor 810. The memory 820 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices).

The processor 810 may execute instructions to perform at least one of the operations described above with reference to FIGS. 1 through 7. For example, the processor 810 may extract metadata of a target layer included in a target model, may compare the metadata of the target layer to reference metadata of each of reference layers, may measure a similarity between the target layer and each of the reference layers, may select a corresponding layer among the reference layers based on the similarity, and may generate a parallelization strategy for the target layer based on a reference parallelization strategy matching the corresponding layer.

Figure 9:
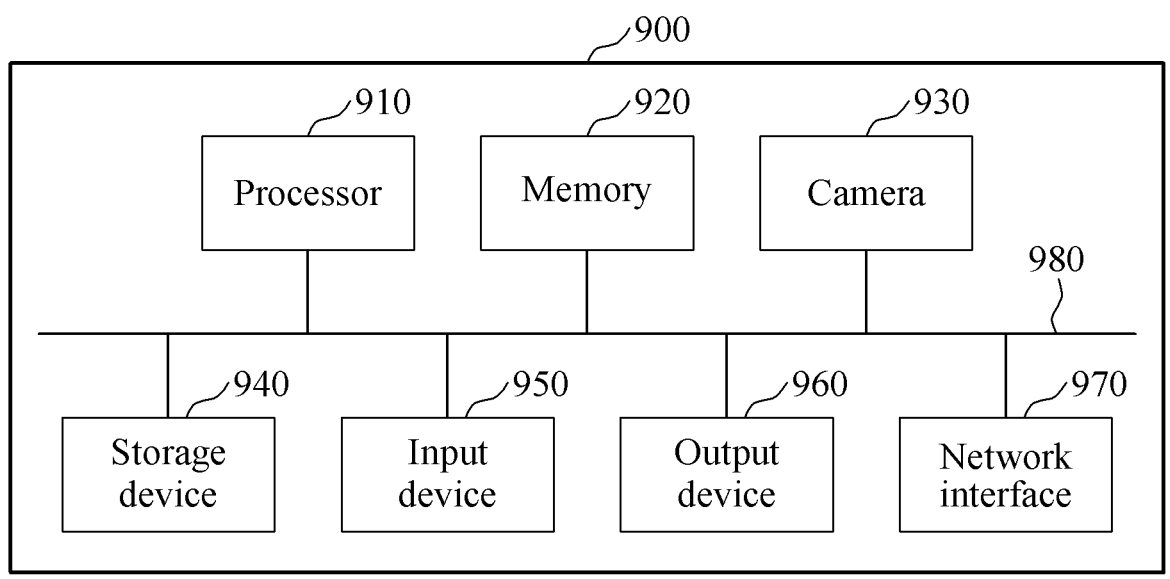
FIG. 9 illustrates an example of an electronic apparatus.

FIG. 9 illustrates an example of an electronic apparatus 900. The electronic apparatus 900 may structurally and/or functionally include the parallel processing apparatus 100 of FIG. 1 and/or the parallel processing apparatus 800 of FIG. 8.

Referring to FIG. 9, the electronic apparatus 900 includes a processor 910, a memory 920, a camera 930, a storage device 940, an input device 950, an output device 960, and a network interface 970. The processor 910, the memory 920, the camera 930, the storage device 940, the input device 950, the output device 960, and the network interface 970 may communicate with each other via a communication bus 980. For example, the electronic apparatus 900 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as a smart vehicle.

The processor 910 may execute instructions and functions in the electronic apparatus 900. For example, the processor 910 may process instructions stored in the memory 920 or the storage device 940. The processor 910 may perform at least one of the operations described above with reference to FIGS. 1 through 8.

The memory 920 may include a non-transitory computer-readable storage medium or a non-transitory computer-readable storage device. The memory 920 may store instructions that are to be executed by the processor 910, and also store information associated with software and/or applications when the software and/or applications are being executed by the electronic apparatus 900.

The camera 930 may capture a photo and/or a video. For example, the camera 930 may capture a facial image including a face of a user, an eye image including an eye of a user, or an iris image including an iris of a user. In an example, the camera 930 may provide a three-dimensional (3D) image including depth information associated with objects.

The storage device 940 may include a non-transitory computer-readable storage medium or a non-transitory computer-readable storage device. The storage device 940 may store a variety of data and modules used in a parallel processing process, for example, a runtime engine, a reference DB, a strategy manager, and a similarity measurer. In an example, the storage device 940 may store a greater amount of information than that of the memory 920 for a relatively long period of time. For example, the storage device 940 may include magnetic hard disks, optical disks, flash memories, floppy disks, or other forms of non-volatile memories known in the art.

The input device 950 may receive an input from a user through a traditional input scheme using a keyboard and a mouse, and through a new input scheme such as a touch input, a voice input and an image input. For example, the input device 950 may detect an input from a keyboard, a mouse, a touchscreen, a microphone or a user, and may include any other device configured to transfer the detected input to the electronic apparatus 900.

The output device 960 may provide a user with an output of the electronic apparatus 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A parallel processing method, the parallel processing method comprising:
   Extracting metadata of a target layer included in a target model based on a neural network;
   measuring a similarity between the target layer and each of reference layers by comparing the metadata of the target layer to reference metadata of each of the reference layers;
   selecting a corresponding layer among the reference layers based on the similarities, wherein, in response to an absence of a layer, from among the reference layers, having a same reference metadata as metadata of the target layer, selecting, from among the reference layers, a layer having most similar reference metadata to the metadata of the target layer as the corresponding layer;
   adding, in response to the layer having most similar reference metadata to the metadata of the target layer being selected as the corresponding layer, reference layer information corresponding to the metadata of the target layer to a reference database (DB) in which reference metadata of each of the reference layers is stored;
   generating a parallelization strategy for the target layer based on a reference parallelization strategy matching the corresponding layer; and
   performing, by the neural network, parallel processing based on the generated parallelization strategy.

2. The parallel processing method of claim 1, wherein selecting the corresponding layer comprises:
   in response to a presence of a layer, from among the reference layers, having a same reference metadata as metadata of the target layer, selecting the layer having a same reference metadata as metadata of the target layer as the corresponding layer.

3. The parallel processing method of claim 1, wherein the reference layer information comprises link information, and
   in response to the layer having most similar reference metadata to the metadata of the target layer being selected as the corresponding layer, identification information of the layer having most similar reference metadata to the metadata of the target layer is recorded as the link information in the reference layer information.

4. The parallel processing method of claim 1, further comprising:
   in response to the reference layer information corresponding to the metadata of the target layer being added to the reference DB, generating a new parallelization strategy corresponding to the metadata of the target layer.

5. The parallel processing method of claim 4, wherein the generating of the new parallelization strategy is performed independently of performing of the parallelization strategy for the target layer.

6. The parallel processing method of claim 4, wherein the generating of the new parallelization strategy is performed in response to an amount of new reference layer information that comprises the reference layer information corresponding to the metadata of the target layer that is added to the reference DB exceeding a threshold.

7. The parallel processing method of claim 4, wherein
   the similarities are measured using a similarity measurement model that is based on the neural network, and
   in response to the new parallelization strategy being generated, the similarity measurement model is retrained based on the new parallelization strategy.

8. The parallel processing method of claim 4, wherein in response to the new parallelization strategy being generated, link information of the reference layer information is changed to an empty state.

9. The parallel processing method of claim 1, further wherein the performing of parallel operations further comprises:
   performing parallel processing of operations related to the target layer based on the generated parallelization strategy to perform image recognition based on input data.

10. A non-transitory computer-readable storage medium storing instructions that, when executed by a processor, cause the processor to perform the parallel processing method of claim 1.

11. A parallel processing apparatus, the parallel processing apparatus comprising:
    a processor
    a memory comprising instructions executable by the processor
    wherein in response to the instructions being executed by the processor, the processor is configured to:
    extract metadata of a target layer included in a target model based on a neural network;
    measure a similarity between the target layer and each of reference layers by comparing the metadata of the target layer to reference metadata of each of the reference layers;
    select a corresponding layer among the reference layers based on the similarities;
    in response to an absence of a layer, from among the reference layers, having a same reference metadata as metadata of the target layer, select a layer from among the reference layers, having most similar reference metadata to metadata of the target layer as the corresponding layer;
    add, in response to the layer having most similar reference metadata to the metadata of the target layer being selected as the corresponding layer, reference layer information corresponding to the metadata of the target layer to a reference database (DB) in which reference metadata of each of the reference layers is stored; and
    generate a parallelization strategy for the target layer based on a reference parallelization strategy matching the corresponding layer,
    wherein the neural network performs parallel processing based on the generated parallelization strategy.

12. The parallel processing apparatus of claim 11, wherein the processor is configured to:
    in response to a presence of a layer, from among the reference layers, having a same reference metadata as metadata of the target layer, select the layer having a same reference metadata as metadata of the target layer as the corresponding layer.

13. A parallel processing apparatus, the apparatus comprising:
a processor; and
a memory comprising instructions executable by the processor,
wherein in response to the instructions being executed by the processor, the processor is configured to:
extract metadata of a target layer included in a neural network-based target model;
measure a similarity between the target layer and each of reference layers by comparing the metadata of the target layer to reference metadata, stored in a reference data base (DB), of each of the reference layers;
select a corresponding layer among the reference layers based on the measured similarities, where metadata of the selected corresponding layer is same as the metadata of the target layer in a first circumstance that corresponds to the measured similarities indicating that the corresponding layer is the same as the target layer, and the selected corresponding layer is not same as the target layer in a second circumstance corresponding to the measured similarities indicating that the metadata of the corresponding layer is not same as the metadata of the target layer and most similar to the metadata of the target layer among the reference layers;
generate a parallelization strategy for the target layer based on a reference parallelization strategy matching the selected corresponding layer; and
in the second circumstance, update the reference DB through an adding of new reference layer information corresponding to the metadata of the target layer to the DBI,
wherein the parallel processing apparatus performs parallel processing based on the generated parallelization strategy.

14. The parallel processing apparatus of claim 13, wherein, in the second circumstance, the new reference layer information comprises link information representing identification information of the selected corresponding layer.

15. The parallel processing apparatus of claim 13, wherein the processor is further configured to, in response to the reference layer information being added to the DB generate a new parallelization strategy corresponding to the metadata of the target layer dependent on the updated DB.

16. The parallel processing apparatus of claim 15, wherein
the similarities are measured using a neural network-based similarity measurement model, and
in response to the new parallelization strategy being generated, the similarity measurement model is retrained based on the new parallelization strategy.

17. The parallel processing apparatus of claim 15, wherein in response to the new parallelization strategy being generated, link information of the reference layer information in the DB is changed to an empty state.

18. An electronic apparatus comprising:
a processor
a memory comprising instructions executable by the processor
wherein in response to the instructions being executed by the processor, the processor is configured to:
extract metadata of a target layer included in a target model based on a neural network;
measure a similarity between the target layer and each of reference layers by comparing the metadata of the target layer to reference metadata of each of the reference layers;
select a corresponding layer among the reference layers based on the similarities, wherein the selecting of the corresponding layer comprises:
in response to an absence of a layer being among the reference layers having a same reference metadata as metadata of the target layer, select, from among the reference layers, a layer having most similar reference metadata to the metadata of the target layer as the corresponding layer; and
in response to the layer having most similar reference metadata to the metadata of the target layer being selected as the corresponding layer, add reference layer information corresponding to the metadata of the target layer to a reference database (DB) in which the reference metadata of each of the reference layers is stored;
generate a parallelization strategy for the target layer based on a reference parallelization strategy matching the corresponding layer; and
performing, by the neural network, parallel processing according to the generated parallelization strategy.

19. The electronic apparatus of claim 18, wherein the processor is configured to:
in response to a presence of a layer, from among the reference layers, having a same reference metadata as metadata of the target layer, select the layer having a same reference metadata as metadata of the target layer as the corresponding layer.

20. A processor-implemented method, comprising:
extracting metadata of a target layer included in a target model based on a neural network;
comparing the metadata of the target layer with metadata of each of a plurality of reference layers;
in a case in which the metadata of the target layer matches the metadata of a specific reference layer among the plurality of reference layers, execute the target layer based on a first parallelization strategy corresponding to the specific reference layer;
in a case in which the metadata of the target layer does not match the metadata of any of the plurality of reference layers, executing the target layer based on a second parallelization strategy corresponding to a reference layer, from among the plurality of reference layers, having a closest similarity to the target layer, generating a new parallelization strategy for the target layer, and subsequently executing the target layer based on the new parallelization strategy; and
performing, by the neural network, parallel processing based on the generated new parallelization strategy.

21. The method of claim 20, wherein executing the target layer based on the second parallelization strategy is performed independently of generating the new parallelization strategy for the target layer.

22. The method of claim 20, wherein generating the new parallelization strategy for the target layer comprises:
determining whether an update condition has been satisfied; and
after the update condition has been satisfied, generating the new parallelization strategy for the target layer based on new reference layer information that has been added to the plurality of reference layers prior to the update condition being satisfied.

23. The method of claim 22, wherein the update condition corresponds to one or both of an amount of time that has passed and an amount of the new reference layer information that has been added.

24. The method of claim 1, wherein some of the reference layers correspond to respective layers of different models.

25. The parallel processing apparatus of claim 12, wherein the processor is further configured to perform an inference operation using, or a training operation of, the target model, including an implementation of the target layer according to the generated parallelization strategy.

26. The parallel processing apparatus of claim 25, wherein in response to the second reference layer being selected as the corresponding layer, reference layer information corresponding to the metadata of the target layer is added to a reference database (DB) in which the reference metadata of each of the reference layers is stored.

27. The parallel processing apparatus of claim 26, wherein
the reference layer information comprises link information, and
in response to the second reference layer being selected as the corresponding layer, identification information of the second reference layer is recorded as the link information in the reference layer information.

28. The parallel processing apparatus of claim 26, wherein the processor is configured to, in response to the reference layer information corresponding to the metadata of the target layer being added to the reference DB, generate a new parallelization strategy corresponding to the metadata of the target layer.

29. The parallel processing apparatus of claim 28, wherein
the similarities are measured using a neural network-based similarity measurement model, and
in response to the new parallelization strategy being generated, the similarity measurement model is retrained based on the new parallelization strategy.

30. The parallel processing apparatus of claim 28, wherein in response to the new parallelization strategy being generated, link information of the reference layer information is changed to an empty state.

* * * * *